United States Patent [19]

Schiff

[11] 4,434,440
[45] Feb. 28, 1984

[54] FM/TV TRANSMISSION SYSTEM

[75] Inventor: Leonard N. Schiff, Lawrenceville, N.J.

[73] Assignee: RCA Corporation, New York, N.Y.

[21] Appl. No.: 324,585

[22] Filed: Nov. 24, 1981

[51] Int. Cl.³ ............................................. H04N 5/38
[52] U.S. Cl. .................................................. 358/186
[58] Field of Search ..................... 358/186; 455/43, 72, 455/110, 116

[56] References Cited

U.S. PATENT DOCUMENTS

| Re. 30,468 | 12/1980 | Dolby et al. | 455/72 |
|---|---|---|---|
| 3,876,939 | 4/1975 | Lerner | 325/46 |
| 3,973,199 | 8/1976 | Widmer | 325/38 B |
| 4,215,431 | 7/1980 | Nady | 455/43 |
| 4,249,214 | 2/1981 | Boyd | 358/186 |
| 4,250,470 | 2/1981 | Szarvas | 455/72 |

Primary Examiner—Michael A. Masinick
Attorney, Agent, or Firm—J. S. Tripoli; D. W. Phillion

[57] ABSTRACT

An improved automatic gain control system for a frequency modulated television (FM/TV) transmitter transmission system comprising a transmitter for generating and transmitting a television (TV) signal, a satellite repeater, and at least one receiver having a demodulator and which collectively form a transmission path having a certain frequency bandwidth with the transmitter comprising a pre-emphasis circuit for pre-emphasizing the TV signal and an FM circuit for frequency modulating the output of the pre-emphasis circuit. The invention provides a filter located at the transmitter for simulating the filter characteristics of the overall transmission path and responsive to the frequency modulated TV signal generated at the transmitter to produce a control signal in the event the spectrum of the frequency modulated TV signal exceeds the transmission path bandwidth. Also provided are variable gain amplifying means responsive to the control signal to amplify the frequency modulated TV signal when this event occurs and thereby preventing the signal presented to the demodulator at the receiver from falling below a recoverable threshold.

7 Claims, 6 Drawing Figures

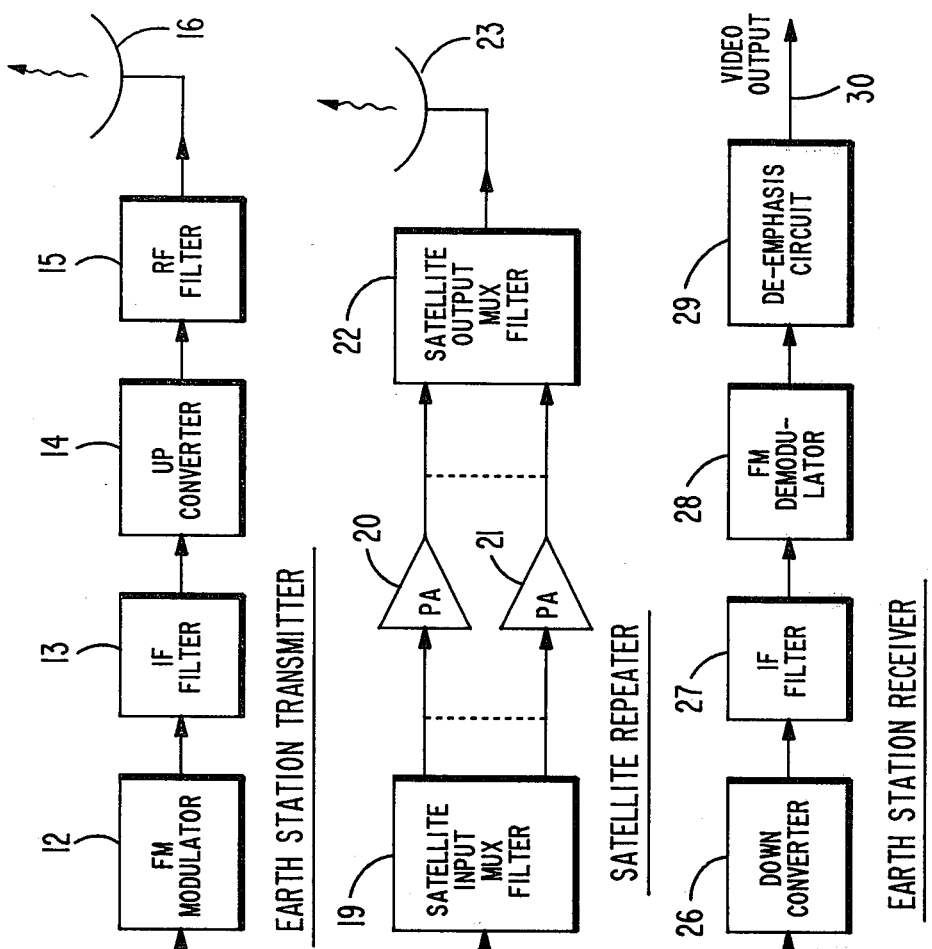
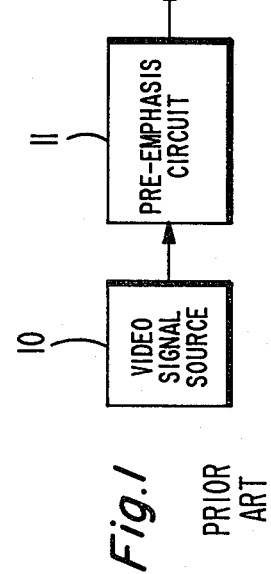
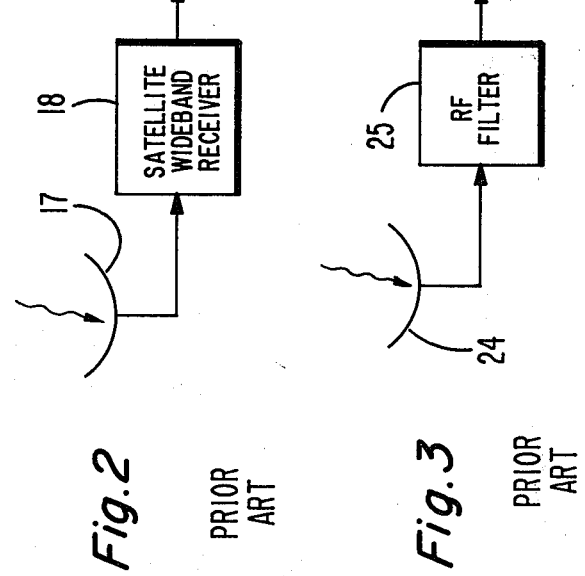
Fig.1 PRIOR ART
Fig.2 PRIOR ART
Fig.3 PRIOR ART

FM/TV TRANSMISSION SYSTEM

This invention relates generally to an automatic gain control (AGC) system for a frequency modulated television (FM/TV) transmission system and more particularly to an AGC system for alleviating the problems caused by over modulation of the TV signal in FM/TV transmission via satellite.

In most systems for transmitting FM/TV via satellite, the video signal at the ground transmitter is pre-emphasized by a filter which boosts the high frequency content of the signal and reduces the low frequency content in order to improve the overall signal-to-noise (S/N) ratio of the signal. The pre-emphasized signal is then fed into an FM modulator, the output of which is supplied to an IF filter. It is then up-converted, i.e., translated to a frequency in the 6 GHz band, and then, after RF filtering, is supplied to an antenna and transmitted. The up-converter is assumed to include a power amplifier.

The signal is received by the satellite, and passed through a wide-band receiver which amplifies the signal. The resulting wide-band signal is then supplied to an input multiplex filter located on the satellite which is the equivalent of a bank of RF (radio frequency) filters, each individual filter corresponding to one of the several channels of video signals being transmitted. The particular TV signal transmitted by the earth station in the present example passes through one of these channels and is then supplied to an amplifier which amplifies the signal to its final output power and then supplies it to an output multiplexer. The output of the output multiplexer is then supplied to the transmit antenna of the satellite repeater.

An earth station receiver receives the signal from the satellite repeater and supplies it successively through an RF filter, a down-converter, and an IF filter. The foregoing processing of the signal functions to isolate and then supply to a frequency demodulator the particular signal corresponding to a particular channel of the several signals being transmitted via satellite, namely, the signal originally transmitted from the earth transmitting station. The output of the FM demodulator is next supplied to a de-emphasis circuit which has characteristics complementary to those of the pre-emphasis circuit located at the earth transmitter.

In order to improve the S/N ratio of the signal received at the earth station, the gain of the signal from the pre-emphasis circuit at the earth transmitter, which is supplied to the FM modulator, is set as large as possible since the larger the deviation of the FM modulator, the greater the S/N ratio will be at the earth station receiver. However, the FM signal, in passing through the earth station equipment, the satellite station, and the earth receiver, must pass through a number of filtering effects. The overall filtering effect is as if the FM/TV system were traversing a single filter having the composite characteristics of all of such filtering effects, both in terms of amplitude versus frequency, and differential group delay versus frequency. If the deviation of the FM modulator is too large, distortion results because the frequency spectrum of the signal being transmitted extends outside the composite filter characteristic into a non-linear range, i.e., the transmitted FM/TV signal has a spectrum which extends into the region of the composite filter in which neither the amplitude nor the group delay is flat with frequency.

Such distortion can result in a reduced carrier-to-noise (C/N) ratio of the video carrier at the receiver with a resulting temporary loss of a picture which can manifest itself on the video screen as streaks or ragged edges on vertical lines.

There are, in the prior art, systems for substantially reducing the distortion of this type. One such system is disclosed in co-pending application, Ser. No. 324,584, filed concurrently herewith by Leonard Schiff, and entitled "FM/TV AUTOMATIC GAIN CONTROL". In this system, however, a circuit is required at the receiver to track the variable gain inserted at the transmitter.

The present invention provides logic for alleviating certain types of distortion introduced by pre-emphasis at the transmitter and which require no detector circuits at the receiver. Thus, where there is a single earth transmitter and many earth receivers, only the transmitter need be equipped with the present invention in order to alleviate the type of distortion that will be described in more detail later herein. The absence of any requirements to modify the receivers has obvious economic benefits.

In accordance with a preferred form of the invention, there is provided at the earth transmitter station circuits for generating an FM/TV signal for transmission over a transmission path having a predetermined bandwidth and an improved automatic gain control circuit including a variable gain amplifier and a control circuit comprising two paths. The first path supplies the FM/TV signal to the variable gain amplifier. The second path comprises a simulating filter which simulates the filter characteristics of the predetermined bandwidth to which the FM/TV signal is supplied. A carrier envelope detector responds to the output of the simulating filter to produce the envelope of the video carrier. Such envelope is then supplied to the control input of the variable gain amplifier which responds thereto to increase its gain whenever the output of the simulating filter falls below a certain threshold so that the S/N ratio of the transmitted signal does not fall below such certain threshold value to become non-recoverable by the receiver ground station. A delay element can be provided in the first path to delay the FM/TV signal supplied to the variable gain amplifier to provide time for such signal to pass through the simulating filter and the carrier envelope detector and then to the control input of the variable gain amplifier.

In the drawings:

FIG. 1 shows a block diagram of a prior art earth station transmitter;

FIG. 2 is a block diagram of a prior art satellite repeater;

FIG. 3 is a block diagram of a prior art earth station receiver;

Figure 4:
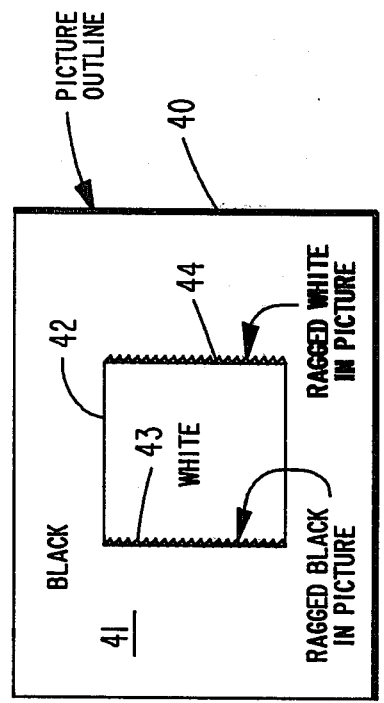
FIG. 4 shows a television screen having a white center on a black background to illustrate certain types of distortion corrected by the present invention.

Referring now to FIGS. 1, 2 and 3, there is shown, respectively, an earth station transmitter, a satellite repeater, and an earth station receiver. FIGS. 1, 2 and 3 are included herein primarily to illustrate the major areas which provide the limiting bandwidth characteristics in the overall system.

In FIG. 1, a video signal is supplied from source 10 to pre-emphasis circuit 11, the output of which is supplied to FM modulator 12 whose output, in turn, is supplied to IF filter 13. An up-converter 14 converts the output of the IF filter 13 to the transmitting frequency which is then supplied to antenna 16 through RF filter 15. It can be seen that the signal passes through a number of filters, including IF filter 13, and RF filter 15, all of which provide some constraint on the available bandwidth in the total transmission path from the earth station transmitter, through the satellite, and then through the earth station receiver.

The signal from the earth station transmitter is received by antenna 17 of the satellite repeater and supplied to satellite wideband receiver 18, the output of which is supplied to satellite input MUX filter 19 which separates the composite received signal into a number of channels each of which is supplied to a power amplifier, such as power amplifiers 20 and 21. Because MUX filter 19 divides the signals into channels, it imposes relatively narrow bandwidth constraints on each channel, and probably is the most important bandwidth constraint in the entire transmission path for a given video signal.

The outputs of power amplifiers 20 and 21 are supplied to a satellite output MUX filter 22 which recombines the signal and supplies a composite signal to antenna 23.

At the earth station receiver, the signal from the satellite is received by antenna 24 and supplied successively through RF filter 25, down-converter 26, IF filter 27, FM demodulator 28, and de-emphasis circuit 29.

The combined effect of all the filtering functions is the earth station transmitter, the satellite repeater, and the earth station receiver are as if FM/TV signals were traversing one single filter having the composite characteristics of all of the filters in all three stations in terms of amplitude versus frequency characteristics and differential group delay versus frequency characteristics.

The problems presented and met by the present invention are created primarily by the pre-emphasis circuit 11 in the earth station transmitter which produces gain at high frequencies and attenuation at low frequencies, functions necessary to boost the high frequency portions of signal, and thereby obtain a higher S/N ratio.

Figure 5:
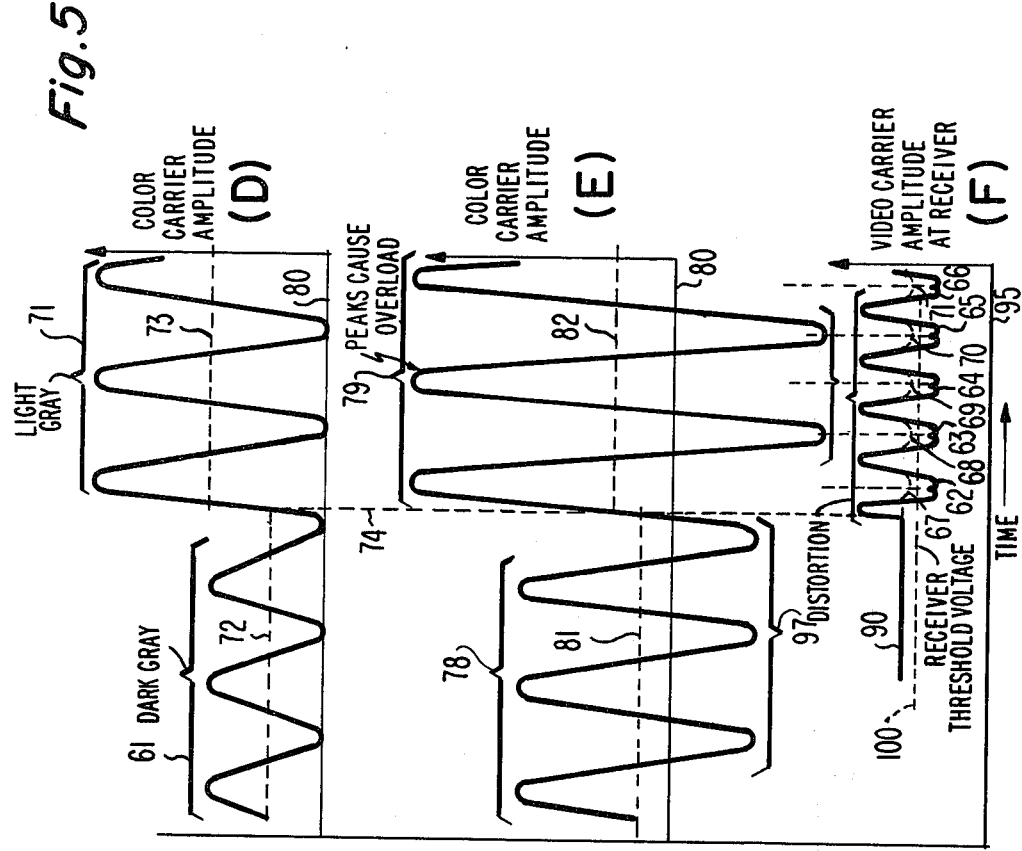
FIG. 5 shows three waveforms A, B and C illustrating one type of distortion introduced by a first type of video signal and waveforms D, E and F illustrating another type of distortion introduced by a second type of video signal with both types of distortion correctable by the present invention.
Figure 5:
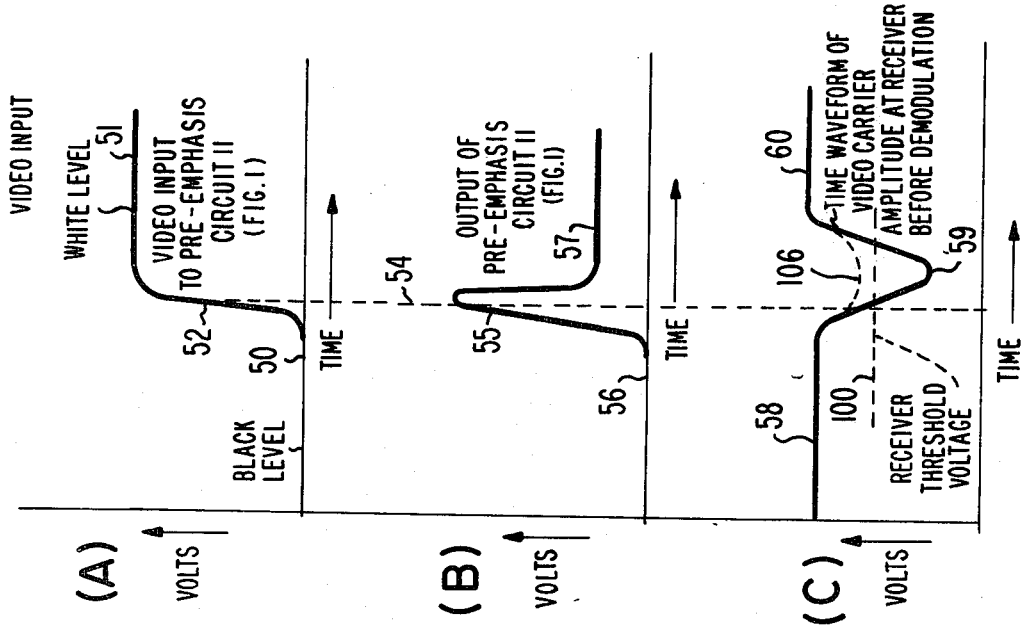

FIG. 5 shows two sets of forms illustrating the kinds of problems resulting from two different types of input waveforms. Waveforms A, B and C of FIG. 5 illustrate the problem presented when a step signal from black to white, for example, occurs along a vertical line on a picture tube as illustrated in FIG . 4. As the electron beam scans from right to left in FIG. 4 and meets the white center 44, located in a black background 41, a sharp increase in energy level is encountered, as shown in waveform A of FIG. 5. The image on the tube screen of FIG. 4 is the image reproduced at the receiver as a result of the signal of FIG. 5A being generated at the transmitter. It should be noted that hereinafter the waveforms of FIG. 5 will, for brevity, be designated as waveforms 5A, 5B, etc. rather than as waveform A of FIG. 5, for example.

In waveform 5A, the video signal is represented as being picture black at level 50 and then, as it meets the white edge of the white area 42 in FIG. 4, rises sharply along the line 52 in waveform 5A to a high white level 51. The signal of 5A is the signal supplied to the input of the pre-emphasis circuit 11 of FIG. 1.

The output of the pre-emphasis circuit 11 is shown in waveform 5B as a pulse due to the filtering effect of pre-emphasis circuit 11 which tends to provide gain to high freqency and to attenuate low frequency components, the latter being designated by the flat, lower section 57 of waveform 5B. The peak 55 of waveform 5B corresponds to the sharp rising edge 52 of waveform 5A. The peak 55 of waveform 5B, when supplied to FM modulator 12 of FIG. 1, will drive the system into its non-linear range, resulting in a negative dip 59 in the time waveform 5C of the video carrier at the receiver before demodulation. The dip 59 in the video carrier actually occurs at the input of FM demodulator 28 due to the composite effects of all the RF and IF filters mentioned previously. At the output of the demodulator 28 in FIG. 3, however, the dip 59 of waveform 5C, represents a carrier-to-noise ratio which is below the threshold at which the receiver will operate. Thus, the receiver becomes temporarily disabled with resulting excess noise in the signal demodulated in demodulator 28 of FIG. 3. Such noise manifests in streaks or ragged edges of the type shown along the vertical line 43 of FIG. 4. Similar problems occur with white to black transitions as represented by line 44 in FIG. 4.

It is this type of noise, as represented by the negative dip 59 in waveform 5C, that is ameliorated by the structure of FIG. 6, which will be described later.

First, however, consider a second type of input signal which will produce similar decreases in the video carrier amplitude at the receiver. Such second type of input signal consists mostly of large excursions of the color carrier amplitude, as will be discussed below.

Reference is made to waveforms 5D, 5E and 5F, which show various stages of such second type signal and its resulting noise. FIG. 5D shows the amplitude of a color carrier signal as it passes from dark gray luminance with low chrominance represented by the signal under bracket 61 to light gray luminance with high chrominance represented by the signal under bracket 71. The waveform of FIG. 5D is the signal supplied to pre-emphasis circuit 11 of the earth station transmitter of FIG. 1. The output of pre-emphasis circuit 11 is represented by the waveform of FIG. 5E in which it can be seen that the high frequency components 78 and 79 are amplified with respect to their counterparts of 61 and 71 of FIG. 5D, and the d.c. levels 81 and 82 have been decreased with respect to the corresponding d.c. levels 72 and 73 of waveform 5D. The increase in amplitude of the color carrier signal in waveform 5E over that of waveform 5D is due to the gain supplied by pre-emphasis circuit 11. The reduction in d.c. levels 81 and 82 in FIG. 5E, under that of 5E waveform 5D, is due to the attenuation of such d.c. levels by the filtering effect of pre-emphasis circuit 11. It should be noted that the pre-emphasis circuit 11 is essentially a differentiator wherein sharp rises appear as peaks and d.c. levels are attenuated.

The peaks of the color carrier amplitude to the left of vertical dotted line 74, which represent the dark gray color luminance, have been amplified but not sufficiently to extend to the non-linear range. However, the color carrier represented the light gray luminance and under the bracket 79 in waveform 5E have positive and negative peaks which do extend into the non-linear range of the system of FIGS. 1-3 so that the output thereof will contain distortion. Such distortion will manifest itself at the input of the demodulator 28, as shown in waveform 5F.

Note that in the flat portion 90 of waveform 5F, the video carrier amplitude is constant since the output of pre-emphasis circuit 11 in the earth station transmitter did not drive the FM modulator 12 into its non-linear range. However, in the portion to the right of dotted line 74 in waveform 5F, with the presence of high-color saturation due to a high color carrier amplitude, the video carrier of waveform 5F is modulated up and down together with the color carrier frequency. As in the case of waveforms 5A through 5C, the distortion in the received video carrier is a result of the deviation of the FM modulator 12 being sufficiently high so that the frequency spectral content of the FM/TV transmission encounters the non-linear portions of the composite filter of the overall transmission path from earth to satellite to ground. If the lower amplitude portions 62, 63, 64, 65 and 66 of the video carrier 90 are below the receiver threshold 100, the receiver will temporarily generate high excess noise.

Figure 6:
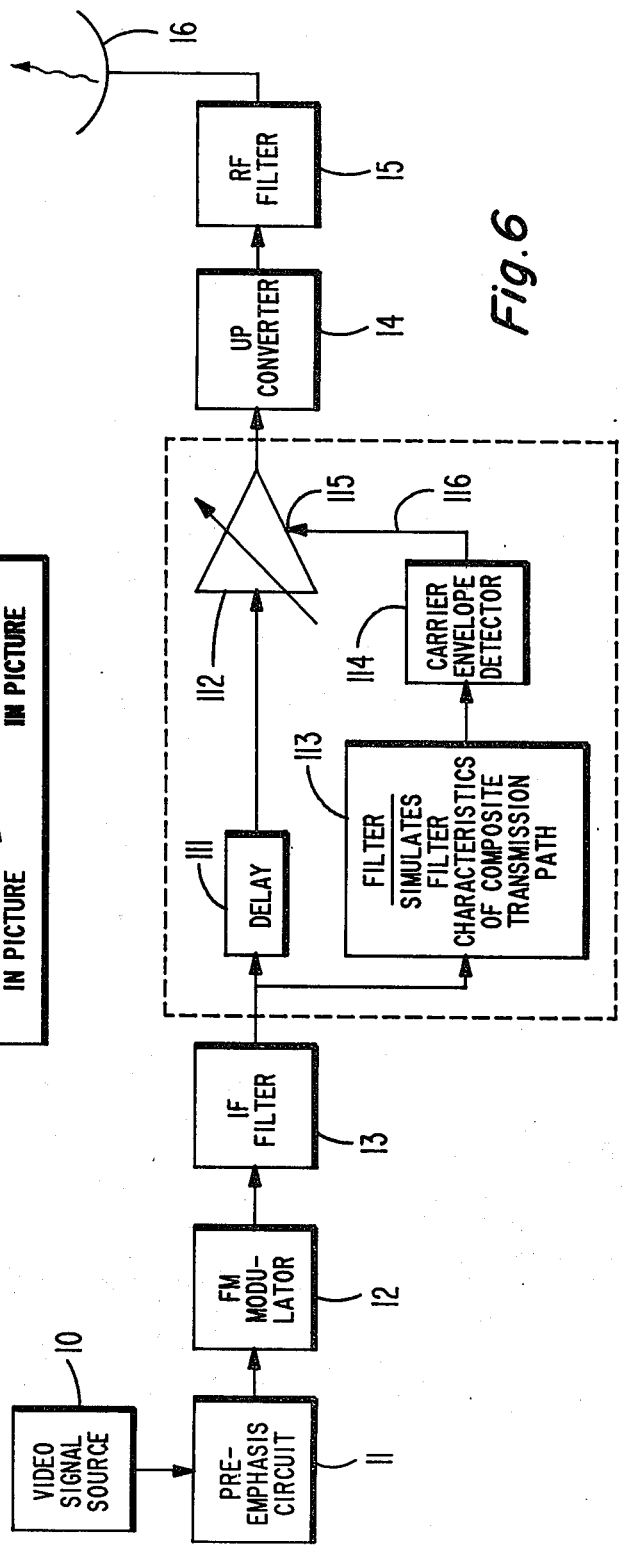
FIG. 6 is a block diagram of the invention.

Referring now to FIG. 6, there is shown the structure of the present invention within the dashed line 110. This structure is inserted between IF filter 13 and up-converter 14 of FIG. 1. The invention comprises two paths with the upper one consisting of delay line 111, and variable gain amplifier 112 connected in series between the output of IF filter 13 and the input of up-converter 14. The second path consists of filter 113 whose input is connected to the output of IF filter 13, and whose output is connected to the input of carrier envelope detector 114. The output of detector 114 is connected to the control input 115 of variable gain amplifier 112 via lead 116. The filter 113 is constructed to simulate the composite filter characteristics of the entire transmission path of the TV signal, including the earth station transmitter of FIG. 1, th satellite repeater of FIG. 2, and the earth station receiver of FIG. 3. Thus, the output of filter 113 will respond to a video input signal of the type shown in waveform 5A to produce at its output 120 a video carrier signal containing substantially the same carrier distortion as would appear in the video carrier signal at the input of the FM demodulator 28 of the earth station receiver of FIG. 3. The carrier envelope detector 114 responds to the output of simulating filter 113 to produce the carrier amplitude time waveform 5C, which contains the negative peak 59. As discussed before, that portion of negative peak 59, which also appears at the input of FM demodulator 28 in FIG. 3 and which lies below the receiver threshold 100 (waveform 5C), is the distortion which causes loss of signal at the receiver since it represents a video carrier whose C/N ratio is below the threshold value 100 detectable by the receiver. The variable gain amplifier 112 is constructed to respond to the output of carrier envelope detector 114 in FIG. 6 to amplify the negative peak 59 of FIG. 5C to a level 106 which can be seen to lie above the receiver threshold level 100, thus avoiding the loss of picture at the receiver which would otherwise occur. Worded in another way, low outputs from envelope detector 114 cause higher gains in amplifier 112 and high outputs produce lower gains. The gain function can be either inversely proportional to the amplitude of the negative peak 59 or can be a single step function triggered by the negative peak 59 dropping below a given threshold.

In waveform 5F, a similar function occurs. The filter 113 and the carrier envelope detector 114 of FIG. 6 function to produce a time waveform of the video carrier as shown in FIG. 5F which is supplied as a control signal to variable gain amplifier 112. The amplifier 112 responds to such control signal to increase the negative peaks 62–66 in waveform 5F to values represented by dashed lines 67–76, which lie above the receiver threshold 100.

A modification of the improvement shown within dashed line 110 of FIG. 6 is to employ an AGC amplifier having only two different values of gain. The carrier envelope detector 114 then responds to the output of filter 113 below a certain value to cause amplifier 112 to assume its higher value of gain and, if the output of filter 113 increases above a certain value, to switch amplifier 112 to its lower gain value.

The invention can also be employed at RF frequency, rather than at the output of IF filter stage 13 by logic similar to that of FIG. 6. More specifically, the logic within dashed block 110 can be inserted between up-converter 14 and a power amplifier which is implicit in up-converter 14 but not actually shown in FIG. 6. Advantages of this arrangement are that delays are easier to implement and the simulating filter 113, rather than being the translated version of the satellite MUX filter 19 plus the other filter effect, can be identical to it in that it operates at RF frequencies.

The receiver stations need not be modified. The foregoing is important since this kind of TV service is contemplated in a point-to-multi-point arrangement where there is only one transmitting earth station but many receiving earth stations. The feature of not having to add equipment at the receiving stations is an important economic advantage.

What is claimed is:

1. In a frequency modulated television (FM/TV) transmitter for transmitting an FM/TV signal over a transmission path having certain bandpass characteristics to at least one receiver having a demodulator, an improved automatic gain control (AGC) system at said transmitter and comprising:

simulating means responsive to said FM/TV signal generated at said transmitter for simulating the bandpass characteristics of said transmission path to produce a simulated FM/TV signal as it would appear at said receiver in the absence of an AGC system;

means responsive to said simulated FM/TV signal to produce a control signal when said FM/TV signal exhibits certain characteristics which will cause the input signal to the receiver demodulator to drop below a predetermined threshold level; and variable gain amplifying means responsive to said FM/TV signal generated at said transmitter and to said control signal to amplify said FM/TV signal when said simulated FM/TV signal outputted from said simulating means exhibits said certain characteristics.

2. In a frequency modulated television (FM/TV) transmitter for transmitting an FM/TV signal over a transmission path having certain filter characteristics to at least one receiver having a demodulator, an improved automatic gain control system at said transmitter comprising:

logic means including means for simulating the said filter characteristics of said overall transmission path and responsive to said FM/TV signal generated at said transmitter to produce a control signal when said FM/TV signal exhibits certain characteristics which will cause the input signal to the receiver demodulator to drop below a predetermined threshold level; and variable gain amplifying means responsive to said control signal to amplify said FM/TV signal so that the input signal to the receiver demodulator will be above said predetermined threshold level when said FM/TV signal exhibits said certain characteristics.

3. In a television (TV) transmitter for transmitting a TV signal over a transmission path having certain frequency bandpass characteristics, an improved automatic gain control system at said transmitter and comprising:

means for simulating the bandpass characteristics of said transmission path and responsive to said TV signal generated at said transmitter to produce a control signal when said TV signal exhibits certain predetermined characteristics; and amplifying means responsive to said control signal to modify said TV signal by a predetermined amount.

4. In a frequency modulated (FM) television (TV) transmitter for use in an FM/TV transmission system having at least one receiver, and a transmission path having a certain bandwidth, and with the transmitter comprising a pre-emphasis circuit for pre-emphasizing said TV signal, and an FM circuit for frequency modulating the output of said pre-emphasis circuit, and further with the receiver comprising a demodulator for demodulating the received TV signal, an improved automatic gain control system comprising:

means for simulating the filter characteristics of said transmission path and responsive to the frequency modulated TV signal generated at said transmitter to produce a control signal when said frequency modulated TV signal results in the input signal to said receiver demodulator dropping below a predetermined threshold level; and variable gain amplifying means responsive to said control signal to amplify said frequency modulated TV signal to a predetermined level to cause the resulting input signal to said receiver demodulator to rise above said predetermined threshold level.

5. In a frequency modulated (FM) television (TV) transmitter for use in an FM/TV transmission system having at least one receiver comprising a demodulator and a transmission path having a certain filter characteristic, and with the transmitter comprising a pre-emphasis circuit for pre-emphasizing said TV signal and an FM circuit for frequency modulating the output of said pre-emphasis circuit to provide an FM/TV signal, an improved automatic gain control system at said transmitter and comprising:

filter means for simulating the filter characteristics of said overall transmission path and responsive to the FM/TV signal generated at said transmitter to produce an output signal when said FM/TV signal results in a below threshold level input signal to said receiver demodulator;

detecting means responsive to said output signal to produce a control signal;

variable gain amplifying means responsive to said control signal to amplify said FM/TV signal to a level resulting in said input signal to said receiver demodulator rising above said threshold level.

6. In a frequency modulated television FM/TV transmission system comprising an earth transmitter, a satellite, and at least one earth receiver which collectively form a transmission path having a certain frequency bandwidth with the transmitter comprising a pre-emphasis circuit for pre-emphasizing said TV signal and an FM circuit for frequency modulating the output of said pre-emphasis circuit, a method for reducing distortion in said system compising the steps of:

filtering at the transmitter the FM/TV signal through a filter having frequency and phase response characteristics simulating those characteristics of the entire overall transmission path to produce an output signal which is similar to the FM/TV signal received at the receiver;

detecting said output signal to produce a control signal;

delaying said FM/TV signal;

amplifying said delayed FM/TV signal in a variable gain amplifier;

controlling the gain of said amplifer with said control signal to amplify said delayed FM/TV signal to maintain said delayed FM/TV signal above a predetermined threshold level, and wherein said predetermined threshold level is that level which, if said FM/TV signal decreases below, will result in loss of signal at said earth receiver.

7. In a frequency modulated television (FM/TV) transmitter for use in an FM/TV transmission system having at least one receiver and a transmission path having a certain frequency bandwidth, and with the transmitter comprising a pre-emphasis circuit for pre-emphasizing said TV signal and an FM circuit for frequency modulating the output of said pre-emphasis circuit, a method of reducing distortion in said system comprising the steps of:

simulating at said transmitter the transmission of the FM/TV signal through said transmission path;

detecting the output signal of said simulated transmission to produce a control signal at said transmitter;

amplifying said FM/TV signal at said transmitter when said control signal drops below a pre-determined threshold.

* * * * *

UNITED STATES PATENT AND TRADEMARK OFFICE
CERTIFICATE OF CORRECTION

PATENT NO. : 4,434,440
DATED : February 28, 1984
INVENTOR(S) : Leonard Norman Schiff It is certified that error appears in the above-identified patent and that said Letters Patent is hereby corrected as shown below:

Col. 1, line 56, "earth receiver" should be --earth station receiver--;

Col. 3, line 37, "is" should be --in--;

Col. 3, line 45, "primarly" should be --primarily--;

Col. 5, line 39, "th" should be --the--.

Signed and Sealed this

Thirteenth Day of November 1984

[SEAL]

Attest:

Attesting Officer

GERALD J. MOSSINGHOFF
Commissioner of Patents and Trademarks